(12) United States Patent
Kim et al.

(10) Patent No.: US 7,777,823 B2
(45) Date of Patent: Aug. 17, 2010

(54) THIN FILM TRANSISTOR ARRAY PANEL

(75) Inventors: Jang-Il Kim, Asan-si (KR); Kweon-Sam Hong, Seoul (KR); Doo-Hwan You, Suwon-si (KR); In-Ho Pakr, Cheongan-si (KR); Hyun-Duck Son, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 112 days.

(21) Appl. No.: 12/018,885

(22) Filed: Jan. 24, 2008

(65) Prior Publication Data

US 2008/0174712 A1   Jul. 24, 2008

(30) Foreign Application Priority Data

Jan. 24, 2007   (KR) .................. 10-2007-0007306

(51) Int. Cl.
   *G02F 1/1343*   (2006.01)
(52) U.S. Cl. ........................... 349/48; 349/144
(58) Field of Classification Search .............. None
   See application file for complete search history.

(56) References Cited

U.S. PATENT DOCUMENTS 7,206,048 B2 * 4/2007 Song ................... 349/129

2008/0024689 A1 * 1/2008 Ahn ..................... 349/43
2008/0143900 A1 * 6/2008 Tsao et al. ............. 349/38
2008/0143912 A1 * 6/2008 Kim ..................... 349/48
2008/0158455 A1 * 7/2008 Yoo et al. .............. 349/38

* cited by examiner

*Primary Examiner*—Mike Stahl
(74) *Attorney, Agent, or Firm*—Cantor Colburn LLP

(57) ABSTRACT

A thin film transistor array panel includes: first and second gate lines disposed on a substrate and separated from each other; a data line intersecting the first and second gate lines; first and second thin film transistors connected to the first gate line and the data line; a third thin film transistor connected to the second gate line and having a drain electrode; and a pixel electrode including a first subpixel electrode and a second subpixel electrode, wherein the first subpixel electrode is connected to the first and third thin film transistor, the second subpixel electrode is connected to the second thin film transistor and includes a projection overlapping the drain electrode, and the projection has a first pair of edge portions that meet a first edge of the drain electrode and are substantially parallel to each other.

12 Claims, 11 Drawing Sheets

THIN FILM TRANSISTOR ARRAY PANEL

This application claims priority to Korean Patent Application No. 10-2007-0007306, filed on Jan. 24, 2007, and all the benefits accruing therefrom under 35 U.S.C. §119, the contents of which in its entirety are herein incorporated by reference.

BACKGROUND OF THE INVENTION (a) Field of the Invention

The present invention relates to a thin film transistor array panel, and particularly to a thin firm transistor array panel for a liquid crystal display.

(b) Description of Related Art

A liquid crystal display (LCD) is one of the most widely used flat panel displays. An LCD includes two panels provided with field-generating electrodes such as pixel electrodes and a common electrode, a liquid crystal (LC) layer interposed therebetween, and at least one polarizer attached to the panel(s). The LCD displays images by applying voltages to the field-generating electrodes to generate an electric field in the LC layer, which determines orientations of LC molecules in the LC layer to adjust polarization of incident light thereby displaying images.

Among the LCDs, a vertical alignment (VA) mode LCD, which aligns LC molecules such that the long axes of the LC molecules are perpendicular to the panels in absence of electric field is spotlighted because of its high contrast ratio and wide reference viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by appropriately arranging the cutouts and the protrusions such that the reference viewing angle is widened.

However, the VA LCD has relatively poor lateral visibility compared with front visibility. In order to improve the lateral visibility, it is suggested that a pixel is divided into two subpixels having different voltages.

One of the improvements suggests that a driving circuit generates individual data voltages for the two subpixels and supplies the generated voltages to the subpixels. However, the driving scheme is complicated. Another of the improvements suggests that the two subpixels are once supplied with the same data voltage and the voltages of the subpixels are differentiated later by using capacitors. However, the voltages of the subpixels may not be expectedly controlled and may not be uniform.

SUMMARY OF THE INVENTION

A thin film transistor array panel according to all embodiment of the present invention includes: a substrate: a first gate line disposed on the substrate; a second gate line disposed on the substrate and separated from the first gate line; a data line intersecting the first and second gate lines: a first thin film transistor connected to the first gate line and the data line; a second thin film transistor connected to the first gate line and the data line; a third thin film transistor connected to the second gate line and having a drain electrode; and a pixel electrode including a first subpixel electrode and a second subpixel electrode, wherein the first subpixel electrode is connected to the first and third thin film transistor, the second subpixel electrode is connected to the second thin film transistor and includes a projection overlapping the drain electrode, and the projection has a first pair of edge portions that meet a first edge of the drain electrode and are substantially parallel to each other.

Edges of the projection and edges of the drain electrode may form two intersections.

Edges of the projection and edges of the drain electrode may form four intersections.

The projection may further comprise a second pair of edge portions that meet a second edge of the drain electrode and are substantially parallel to each other, and a distance between the edge portions in the first pair along a first direction may be substantially the same as a distance between the edge portions in the second pair along the first direction.

The first edge and the second edge of the drain electrode may include a first pair or drain edge portions substantially parallel to each other and a second pair of drain edge portions substantially parallel to each other.

A distance between the edge portions in the first pair of drain edge portions along a second direction substantially perpendicular to the first direction may be substantially the same as a distance between the edge portions in the second pair of drain edge portions along the second direction.

The edge portions and the drain edge portions may be equal to or longer than twice an allowable alignment error range.

The projection may have a shape of a bar and passes through the drain electrode.

The projection has a uniform width, and the drain electrode may also have a uniform width.

The projection may have a branch fully overlapping the drain electrode.

The thin film transistor array panel may further include a storage electrode overlapping the drain electrode.

BRIEF DESCRIPTION OF THE DRAWINGS

The present invention will become more apparent by describing embodiments thereof in detail with reference to the accompanying drawing in which.

DETAILED DESCRIPTION OF EMBODIMENTS

Figure 1:
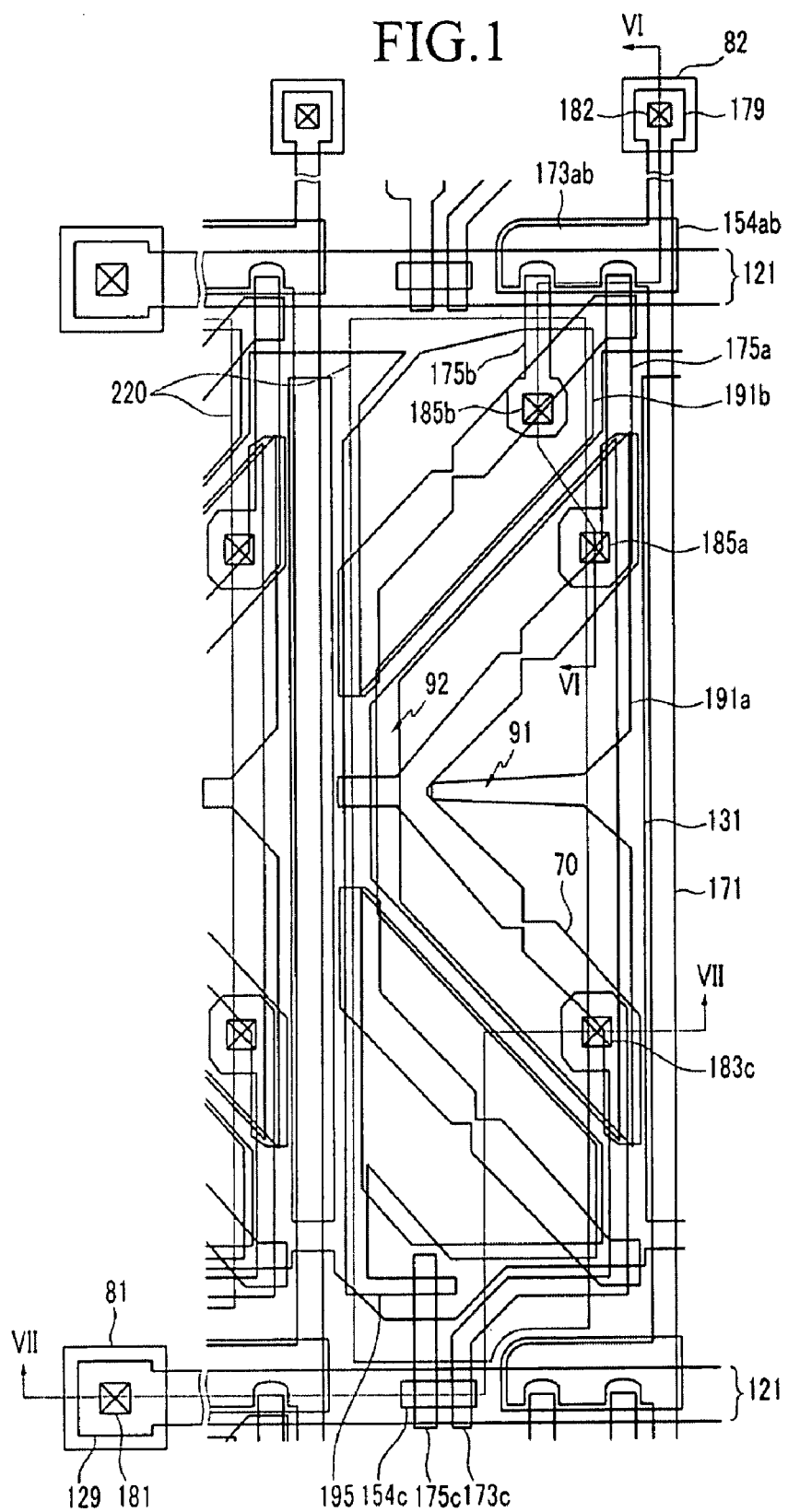
FIG. 1 is a layout view of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

An LCD according to an embodiment of the present invention will be described in detail with reference to FIG. 1 to FIG. 7.

Figure 2:
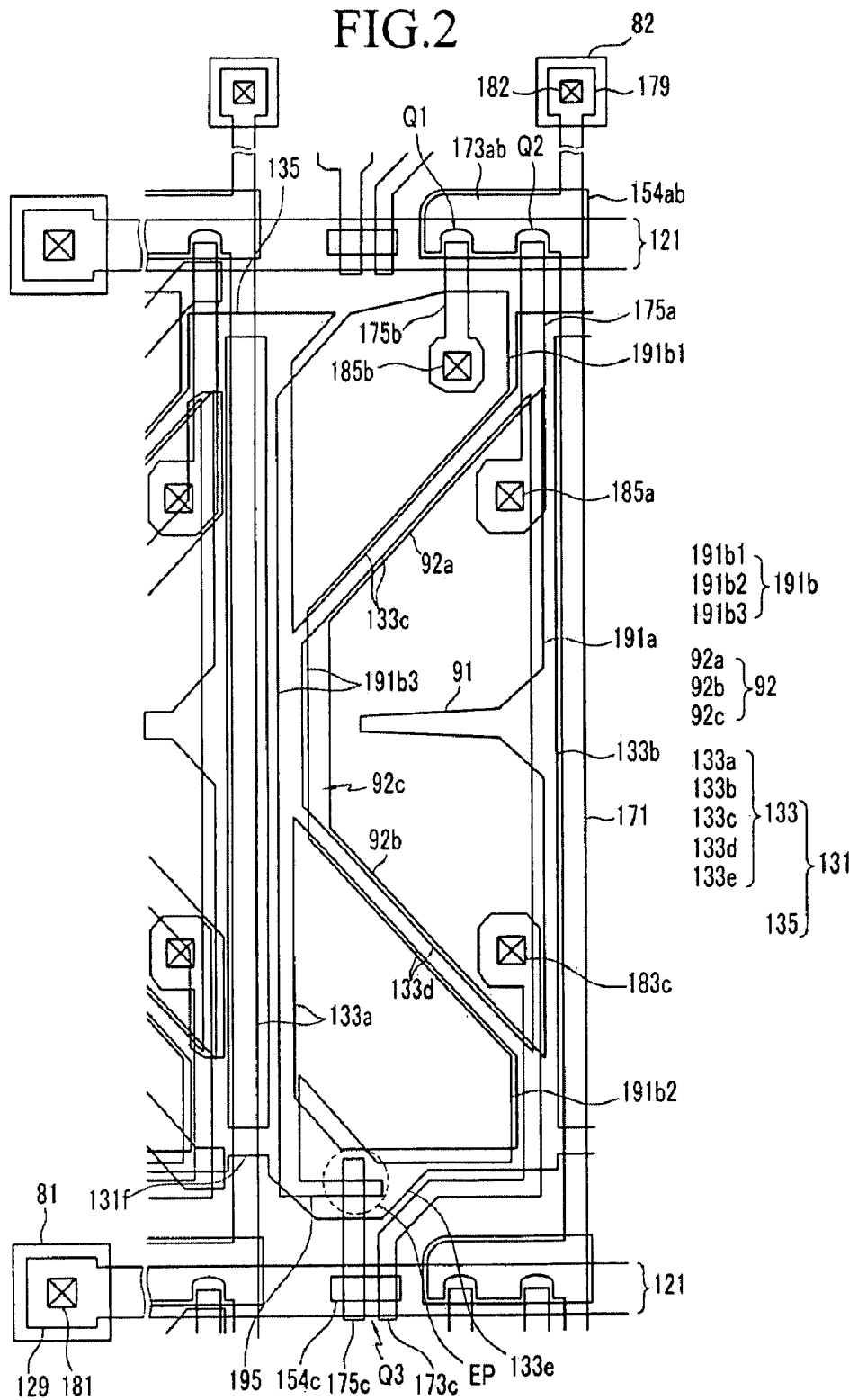
FIG. 2 is a layout view of a TFT array panel of the LCD shown in FIG. 1.
Figure 3:
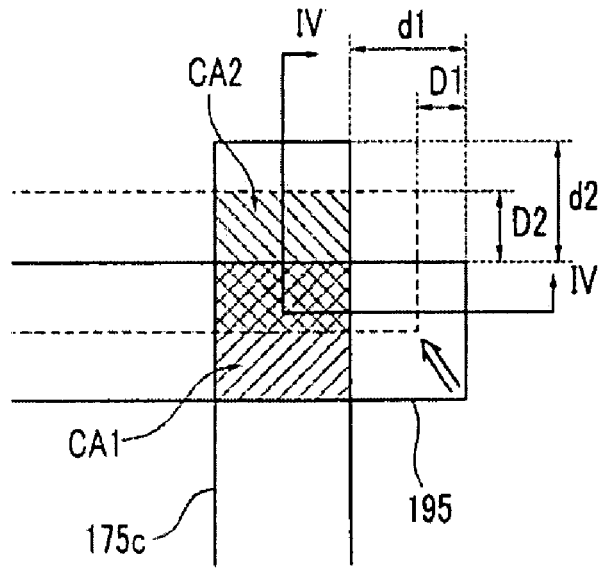
FIG. 3 is an expanded view of a portion of the TFT array panel shown in FIG. 2.
Figure 4:
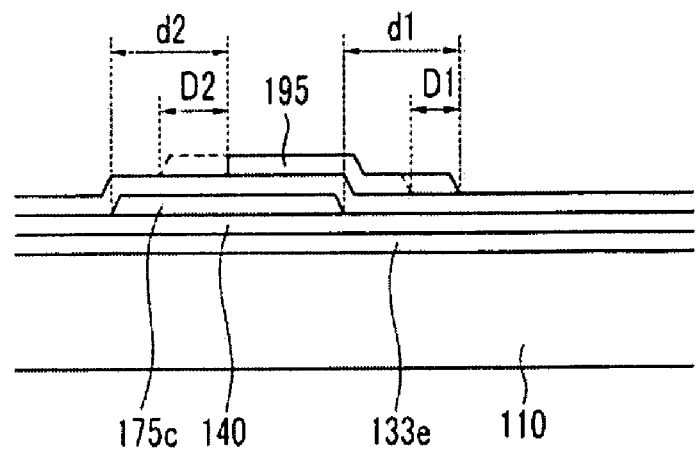
FIG. 4 is a sectional view of the portion shown in FIG. 3 taken along line IV-IV.
Figure 5:
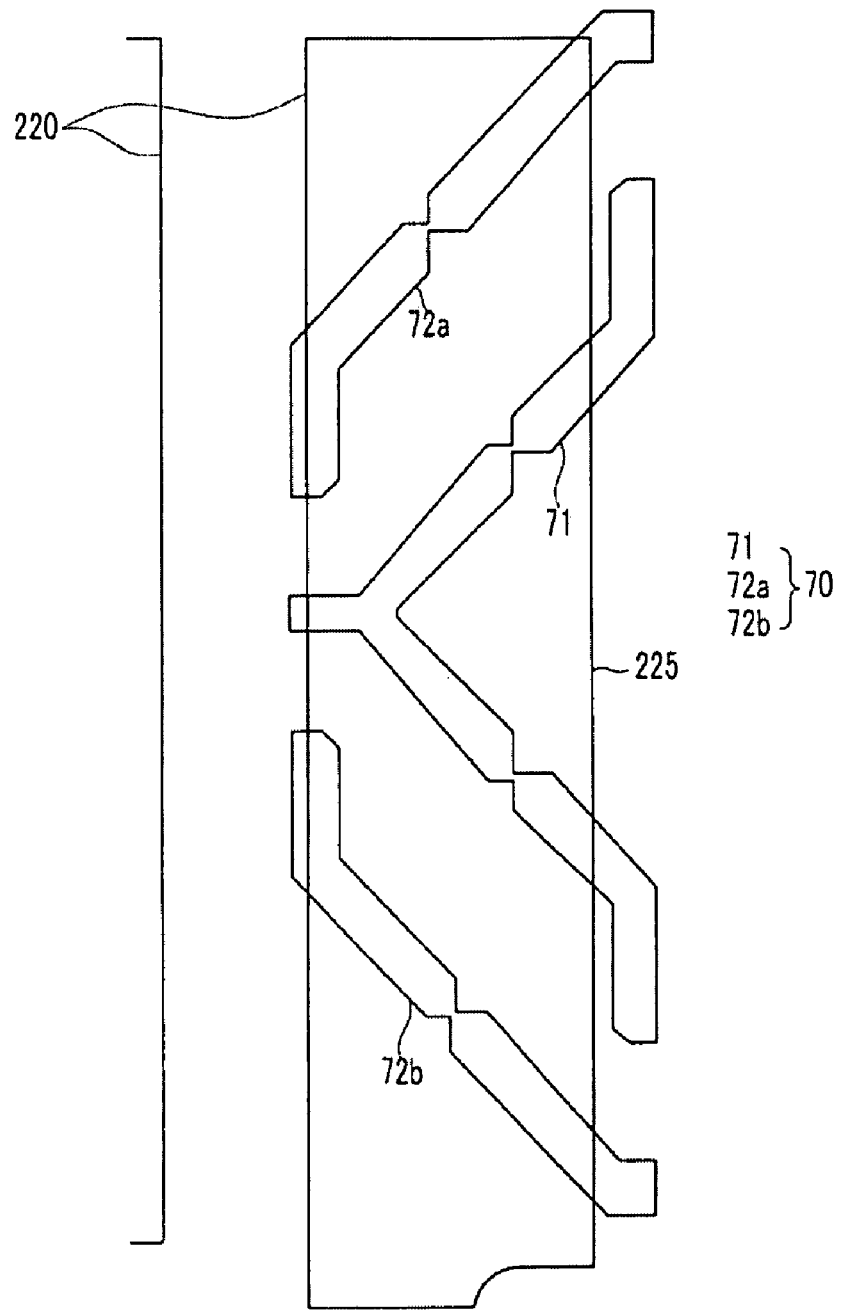
FIG. 5 is a layout view of a common electrode panel of the LCD shown in FIG. 1.
Figure 6:
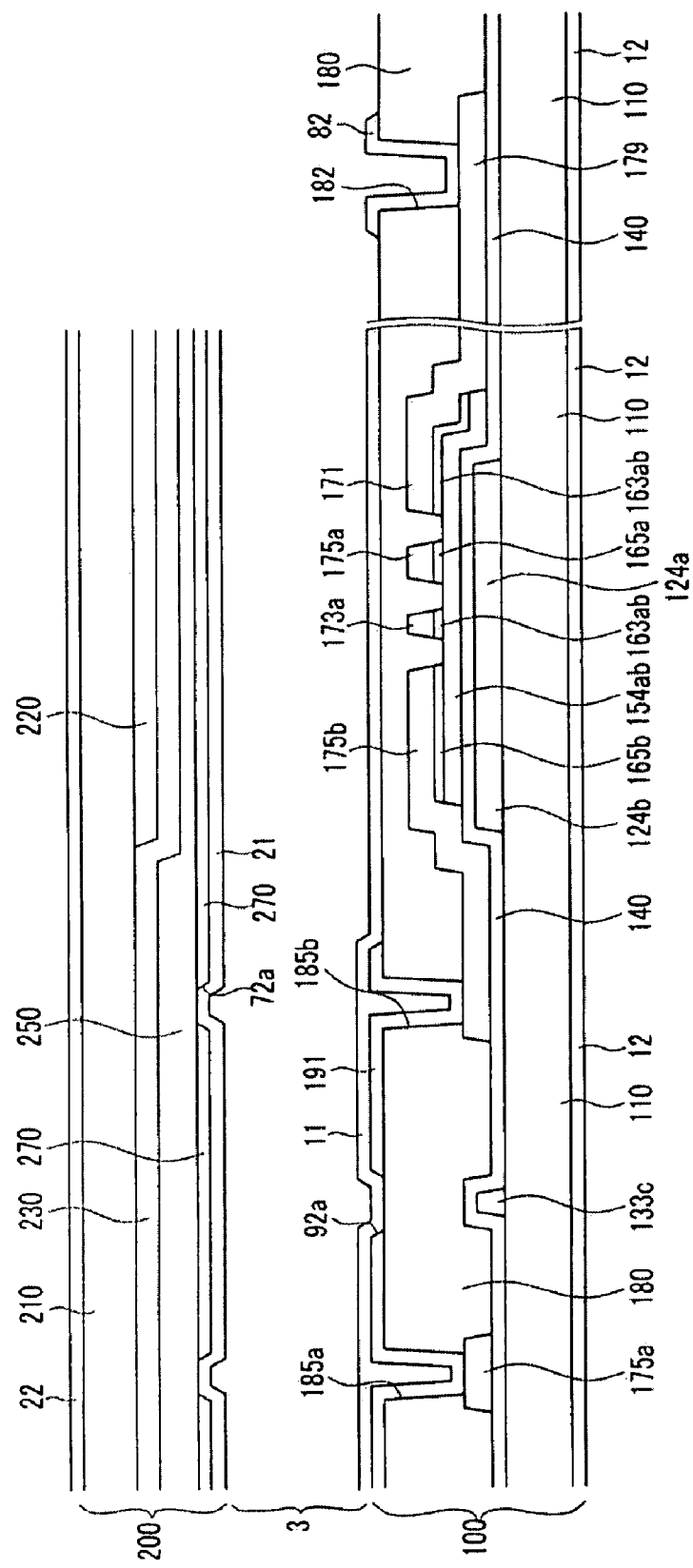
FIG. 6 is a sectional view of the LCD shown in FIG. 1 taken along line VI-VI.
Figure 7:
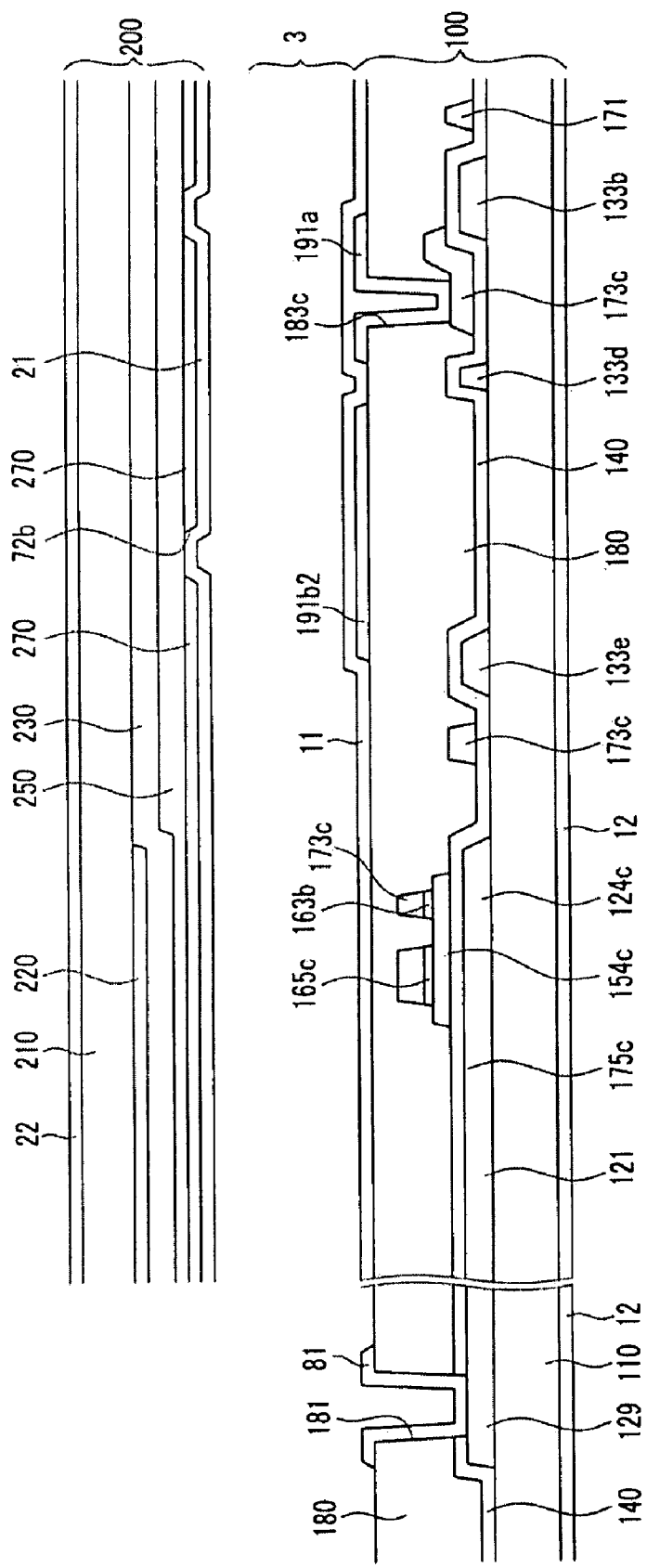
FIG. 7 is a sectional view of the LCD shown in FIG. 1 taken along line VII-VII.

FIG. 1 is a layout view of an LCD according to an embodiment of the present invention. FIG. 2 is a layout view of a TFT array panel of the LCD shown in FIG. 1, FIG. 3 is an expanded view of a portion of the TFT array panel shown in FIG. 2, FIG. 4 is a sectional view of the portion shown in FIG. 3 taken along line IV-IV, and FIG. 5 is a layout view of a common electrode panel of the LCD shown in FIG. 1. FIG. 6 is a sectional view of the LCD shown in FIG. 1 taken along line VI-VI, and FIG. 7 is a sectional view of the LCD shown in FIG. 1 taken along line VII-VII.

Referring to FIGS. 1-7, an LCD according to an embodiment of the present invention includes a TFT array panel 100, a common electrode panel 200, and a liquid crystal layer 3 interposed between the panels 100 and 200.

First, the TFT array panel 100 will be described with reference to FIGS. 1-4, 6 and 7.

A plurality of gate conductors including a plurality of gate lines 121 and a plurality of storage electrode lines 131 are formed on an insulating substrate 110 such as transparent glass or plastic.

The gate lines 121 transmit gate signals and extend substantially in a transverse direction. Each of the gate lines 121 includes an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may extend to be connected to a driving circuit that may be integrated on the substrate 110.

The storage electrodes 131 are supplied with a predetermined voltage such as a common voltage and each of the storage electrode lines 131 includes a plurality of sets 133 of storage electrodes and a plurality of storage connections 135.

Each set 133 of the storage electrodes includes first, second, third, fourth, and fifth storage electrodes 133a, 133b, 133c, 133d, 133e. The first and the second storage electrodes 133a and 133b extend in a longitudinal direction and are connected to the fifth storage electrode 133e at their lower ends. The first storage electrode 133a includes a projection having an oblique edge relative to the gate lines 121. A left portion of the fifth storage electrode 133 is wide and has an oblique edge. The third and the four storage electrodes 133c and 133d obliquely extend approximately from a center of the first storage electrode 133a approximately to upper and lower ends of the second storage electrode 133b, respectively.

Each of the storage connections 135 is connected to a first storage electrode 133a of a set 133 of storage electrodes and a second storage electrode 133b of another set 133 of storage electrodes adjacent thereto. However, the storage electrode lines 131 may have various shapes and arrangements.

The gate conductors 121 and 131 may be made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the two films may be made of low resistivity metal including Al containing metal, Ag containing metal, and Cu containing metal for reducing signal delay or voltage drop. The other film may be made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate conductors 121 and 131 may be made of various metals or conductors.

The lateral sides of the gate conductors 121 and 131 are inclined relative to a surface of the substrate 110, and the inclination angle thereof ranges about 30-80 degrees.

A gate insulating layer 140 that may be made of silicon nitride (SiNx) or silicon oxide (SiOx) is formed on the gate conductors 121 and 131.

A plurality of pairs of semiconductor islands 154ab and 154c that may be made of hydrogenated amorphous silicon (abbreviated to "a-Si") or polysilicon are formed on the gate insulating layer 140. Each of the semiconductor islands 154ab is disposed on the gate lines 121.

Three ohmic contact islands 163ab, 165a and 165b are formed on each of the semiconductor islands 154ab, and a pair of ohmic contact islands 163c and 165c are formed on each of the semiconductor islands 154c. The ohmic contacts 163ab, 163c, 165a, 165b and 165c may be made of n+ hydrogenated a-Si heavily doped with n type impurity such as phosphorous or they may be made of silicide.

The lateral sides of the semiconductor islands 154ab and 154c and the ohmic contacts 163ab, 163c, 165a, 165b and 165c are inclined relative to the surface of the substrate 110, and the inclination angles thereof may be in a range of about 30-80 degrees.

A plurality of data conductors including a plurality of data lines 171, a plurality of source electrodes 173c, and a plurality of drain electrodes 175a, 175b and 175c are formed on the ohmic contacts 163ab, 163c, 165a, 165b and 165c and the gate insulating layer 140.

The data lines 171 transmit data signals and extend substantially in the longitudinal direction to intersect the gate lines 121 and the storage connections 135. Each of the data lines 171 includes an end portion 179 having a large area for contact with another layer or an external driving circuit. A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a driving circuit that may be integrated on the substrate 110.

Each of the data lines 171 includes a plurality of source electrode portions 173ab projecting left toward the gate lines 121 and overlapping the semiconductor islands 154ab. Each of the portions 173ab has two concavities that form first and second source electrodes.

The source electrodes 173c, namely, the third source electrodes 173c are separated from the data lines 171. Each of the third source electrodes 173c extends upward from an end portion overlapping the semiconductor island 154c, detours around the source electrode portion 173ab, overlaps the second storage electrodes 133b, and extend parallel to the data line 171. The other end portion of the third source electrode 173 somewhat expands for contact with other layers.

The first to third drain electrodes 175a, 175b and 175c are separated from one another and from the data lines 171 and the third source electrodes 173c.

The first and the second drain electrodes 175a and 175b extend downward from one end portions overlapping the semiconductor island 154ab and the other end portions of the first and the second drain electrodes 175a and 175b have width wider than other portions. The first drain electrode 175a overlaps the second storage electrode 133b and one end portion of the first drain electrode 175a faces the first source electrode. One end portion of the second drain electrode 175c faces the second source electrode.

The third drain electrode 175c has a shape of a bar having a uniform width and extends in the longitudinal direction. One end portion of the third drain electrode 175c overlaps the semiconductor island 154c and faces the third source electrodes 173c, and the other end portion of the third drain electrode 175c overlaps the fifth storage electrode 133e.

A portion of the gate line 121 overlapping the first source electrode and the first drain electrode 175a is to be a first gate electrode 124a, and another portion of the gate line 121 overlapping the second source electrode and the second drain electrode 175b is to be a second gate electrode 124b. In addition, a portion of the gate line 121 overlapping the third source electrode 173c and the third drain electrode 175c is to be a third gate electrode 124c. The first to third gate electrodes 124a, 124b, 124c may project upward or downward.

A first gate electrode 124a, a first source electrode, and a first drain electrode 175a along with a semiconductor island 154ab form a TFT having a channel formed in a portion of the semiconductor island 154ab disposed between the first source electrode and the first drain electrode 175a. A second gate electrode 124b, a second source electrode, and a second drain electrode 175c along with a semiconductor island 154ab form a TFT having a channel formed in a portion of the semiconductor island 154ab disposed between the second source electrode and the second drain electrode 175b. In addition, a third gate electrode 124c, a third source electrode 173c, and a third drain electrode 175 along with a semiconductor island 154c form a TFT having a channel formed in a portion of the semiconductor island 154c disposed between the third source electrode 173c and the third drain electrode 175c.

The data conductors 171, 173c, 175a, 175b, 175c may be made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171, 173c, 175a, 175b, 175c may be made of various metals or conductors.

The data conductors 171, 173c, 175a, 175b, 175c have inclined edge profiles, and the inclination angles thereof range about 30-80 degrees.

The ohmic contacts 163ab, 163c, 165a, 165b and 165c are interposed only between the underlying semiconductor islands 154ab and 154c and the overlying data conductors 171, 173c, 175a, 175b. 175c thereon and reduce the contact resistance therebetween. The semiconductor islands 154ab and 154c include some exposed portions, which are not covered with the data conductors 171, 173c, 175a, 175b, 175c, such as portions located between the first to third source electrodes 173ab and 173c and the first to third drain electrodes 175a-175c.

A passivation layer 180 is formed on the data conductors 171, 173c, 175a, 175b, 175c and the exposed portions of the semiconductor islands 154ab and 154c. The passivation layer 180 may be made of an inorganic insulator or an organic insulator and it may have a flat top surface. Examples of the inorganic insulator include silicon nitride and silicon oxide. The organic insulator may have photosensitivity and dielectric constant less than about 4.0. The passivation layer 180 may include a lower film of an inorganic insulator and an upper film of an organic insulator such that it takes the excellent insulating characteristics of the organic insulator while preventing the exposed portions of the semiconductor islands 154ab and 154c from being dram aged by the organic insulator.

The passivation layer 180 has a plurality of contact holes 182 exposing the end portions 179 of the data lines 171, a plurality of contact holes 183c exposing the wide end portions of the third source electrode 173c, and a plurality of contact holes 185a and 185b exposing the wide end portions of the first and the second drain electrodes 175a and 175b, respectively. The passivation layer 180 and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180. They may be made of transparent conductor such as ITO or IZO or reflective conductor such as Ag, Al, Cr, or alloys thereof.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

Each of the pixel electrodes 191 is approximately a rectangle that has four main edges nearly parallel to the gate lines 121 or the data lines 171 as well as chamfered upper and lower left corners. The chamfered edges of the pixel electrode 191 make an angle of about 45 degrees with the gate lines 121. A left edge of the pixel electrode 191 is disposed on the first storage electrode 133a and a portion of a right edge of the pixel electrode 191 is disposed on the second storage electrode 133b. The oblique edge of the first storage electrodes 133a may be parallel to a chamfered edge of the pixel electrode 191 adjacent thereto.

The pixel electrode 191 includes a first subpixel electrode 191a and a second subpixel electrode 191b divided by a gap 92, and it substantially has an inversion symmetry with respect to an imaginary transverse line bisecting the pixel electrode 191.

The gap 92 includes an upper portion 92a, a lower portion 92b, and a longitudinal portion 92c. The upper and lower portions 92a and 92b obliquely extend approximately from the left edge of the pixel electrode 191 approximately to the right edge of the pixel electrode 191 and overlap the third and fourth storage electrodes 133c and 133d, respectively. The upper and lower portions 92a and 92b of the gap 92 make an angle of about 45 degrees with the gate lines 121 and they make a right angle with each other.

The first subpixel electrode 191a is an isosceles trapezoid rotated by a right angle according to the shape of the gap 92. The right edge of the first subpixel electrode 191a overlaps the second storage electrode 133b, and the first subpixel electrode 191a has a cutout 91 extending from around a center of the right edge along the imaginary transverse line. An inlet of the cutout 91 is formed by a pair of inclined edges substantially parallel to the lower cutout 92a and the upper cutout 92b, respectively. The gap 92 is also named as a cutout for descriptive convenience.

The first subpixel electrode 191a is connected to the first drain electrode 175a and the third source electrode 173c through the contact holes 185a and 183c.

The second subpixel electrode 191b includes an upper electrode portion 191b1, a lower electrode portion 191b2, a connecting portion 191b3, and a projection 195.

The upper and lower electrode portions 191b1 and 191b2 are nearly right-angled trapezoids rotated by a right angle, when the chamfered corners are not considered. The right edges of the upper and lower electrode portions 191b1 and 191b2 are spaced apart from the first drain electrode 175a and the third source electrode 173c so that the upper and lower electrode portions 191b1 and 191b2 do not overlap are the first drain electrode 175a and the third source electrode 173c, and thus the upper and lower electrode portions 191b1 and 191b2 are disposed left to the right edge of the first subpixel electrode 191a. The upper electrode portion 191b1 is connected to the second drain electrode through the contact hole 185b. The connecting portion 191b3 connects the upper electrode portion 191b1 and the lower electrode portion 191b2, and it overlaps the first storage electrode 133a such that its left edge is disposed on the first storage electrode 133a and its right edge is disposed outside the first storage electrode 133a.

Most of the projection 195 is disposed on the fifth storage electrode 133e and has a shape of a bar. The projection 195 extends downward from the meeting point of the lower left oblique edge and the left edge of the lower electrode portion 191b2, turns right and overlaps and passes through the third drain electrode 175c. As shown in FIGS. 3 and 4, a portion of the projection 195 disposed near the intersection with the third drain electrode 175c has a uniform width, and so the third drain electrode 175c does. The bar-shaped projection 195 and the third drain electrode 175c pass through each other. In detail, the right end of the projection 195 is located outside the third drain electrode 175c, and similarly, the upper end of the third drain electrode 175c is located outside the projection 195. This configuration is established by, when the LCD is designed, making the distance d1 between the right end of the projection 195 and the right edge of the third drain electrode 175c larger than the allowable misalignment error D1 in the transverse direction in the fabrication of thin film patterns and the distance d2 between the upper edge of the projection 195 and the upper end of the third drain electrode 175c larger than the allowable misalignment error D2 in the longitudinal direction in the fabrication of thin film patterns. This configuration makes the overlapping area uniform regardless of the misalignment within the allowable misalignment error D1 and D2.

For example, although the projection 195 is formed in a position located aside from the correct position left and up by an amount of allowable misalignment error D1 and D2 as shown in FIGS. 3 and 4, the overlapping area CA2 between the projection 195 and the third drain electrode 175c is substantially the same as the overlapping area CA1 for the correct position. This is also true when the projection 195 and the third drain electrode 175c are misaligned in any direction.

The description of the common electrode panel 200 follows with reference to FIGS. 1, 5 and 7.

A light blocking member 220 referred to as a black matrix for preventing light leakage is formed on an insulating substrate 210 such as transparent glass or plastic. The light blocking member 220 has a plurality of openings 225 facing the pixel electrodes 191 and the openings 225 may have substantially the same planar shape as the pixel electrodes 191. Otherwise, the light blocking member 220 may include a plurality of rectilinear portions facing the data lines 171 on the TFT array panel 100 and a plurality of widened portions tracing the TFTs on the TFT array panel 100.

A plurality of color filters 230 are also formed on the substrate 210 and they are disposed substantially in the areas enclosed by the light blocking member 220. The color filters 230 may extend substantially in the longitudinal direction along the pixel electrodes 191. Each of the color filters 230 may represent one of the primary colors such as red, green and blue colors.

An overcoat 250 is formed on the color filters 230 and the light blocking member 220. The overcoat 250 may be made of (organic) insulator and it prevents the color filters 230 from being exposed and provides a flat surface. The overcoat 250 may be omitted.

A common electrode 270 is formed on the overcoat 250. The common electrode 270 may be supplied with the common voltage and made of transparent conductive material such as ITO and IZO.

The common electrode 270 has a plurality of sets 70 of cutouts. A set 70 of cutouts 71-72b faces a pixel electrode 191 and include a center cutout 71, a lower cutout 72a, and an upper cutout 72b. Each of the cutouts 71-72b is disposed between adjacent cutouts 91-92b of the pixel electrode 191 or between a cutout 92a or 92b and a chamfered edge of the pixel electrode 191. Each of the cutouts 71-72b has at least an oblique portion having a depressed notch and extending substantially parallel to the lower cutout 92a or the upper cutout 92b of the pixel electrode 191. The cutouts 71-72b have substantially an inversion symmetry with respect to the above-described imaginary transverse line bisecting the pixel electrode 191.

Each of the lower and upper cutouts 72a and 72b includes an oblique portion, a transverse portion, and a longitudinal portion. The oblique portion extends approximately from a left edge of the pixel electrode 191 approximately to lower or upper edge of the pixel electrode 191. Each of the transverse and the longitudinal portions extends from a respective end of the oblique portion along an edge of the pixel electrode 191, overlapping the edge of the pixel electrode 191, and making an obtuse angle with the oblique portion.

The center cutout 71 includes a central transverse portion, a pair of oblique portions, and a pair of terminal longitudinal portions. The central transverse portion extends approximately from the left edge of the pixel electrode 191 along the above-described transverse line. The oblique portions extend from an end of the central transverse portion approximately to the right edge of the pixel electrode 191 and make oblique angles with the central transverse portion. The terminal longitudinal portions extend from the ends of the respective oblique portions along the right edge of the pixel electrode 191, overlapping the right edge of the pixel electrode 191, and making obtuse angles with the respective oblique portions.

The pixel electrode 191 may have further cutouts substantially parallel to the upper portion 92a and the lower portion 92b of the gap 92, and accordingly, the common electrode 270 may also have further cutouts. The number of the cutouts 71-72b, 91 and 92 may be varied depending on the design factors such as the size of the pixel electrode 190, the ratio of the transverse edges and the longitudinal edges of the pixel electrode 190, the type and characteristics of the liquid crystal layer 3, and so on. The light blocking member 220 may also overlap the cutouts 71-72b to block the light leakage through the cutouts 71-72b.

Alignment layers 11 and 21 that may be homeotropic are coated on inner surfaces of the panels 100 and 200, and polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film (not shown) for compensating the retardation of the LC layer 3. The LCD may further include a backlight unit (not shown) supplying light to the LC layer 3 through the polarizers 12 and 22, the retardation film and the panels 100 and 200.

It is preferable that the LC layer 3 has negative dielectric anisotropy and it is subjected to a vertical alignment that the LC molecules 31 in the LC layer 3 are aligned such that their long axes are substantially vertical to the surfaces of the panels 100 and 200 in absence of electric field. Accordingly, incident light cannot pass the crossed polarization system 12 and 22.

Figure 8:
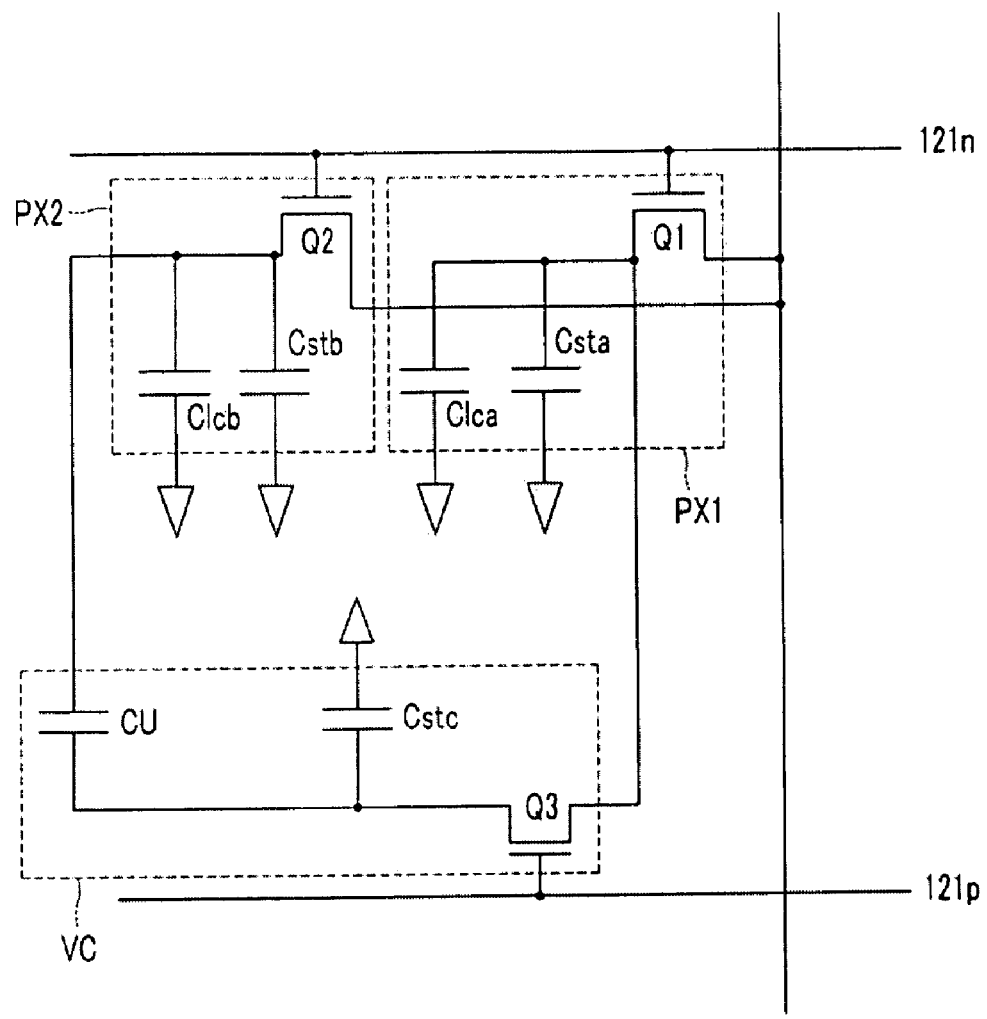
FIG. 8 is an equivalent circuit diagram of the LCD shown in FIGS. 1-7.

The above-described LCD is represented by an equivalent circuit shown in FIG. 8.

Referring to FIG. 8, a pixel of the LCD includes a first subpixel PX1, a second subpixel PX2, and a voltage control element VC. The first subpixel PX1 includes a first TFT Q1, and a first liquid crystal capacitor Clca and a first storage capacitor Csta connected to the first TFT Q1, and the second subpixel PX2 includes a second TFT Q2, and a second liquid crystal capacitor Clcb and the second storage capacitor Cstb connected to the second TFT Q2. The voltage control element VC includes a third TFT Q3, and an up-down capacitor CU and a third storage capacitor Cstc.

The first liquid crystal capacitor Clca includes the first subpixel electrode 191a as one terminal, a corresponding portion of the common electrode 270 as the other terminal, and a portion of the liquid crystal layer 3 disposed between the two terminals as a dielectric. Similarly, the second liquid crystal capacitor Clcb includes the second subpixel electrode 191b as one terminal, a corresponding portion of the common electrode 270 as the other terminal, and a portion of the liquid crystal layer 3 disposed between the two terminals as a dielectric.

The first and second storage capacitor Csta and Cstb include the first subpixel electrode 191a and the second subpixel electrode 191b as one terminals, respectively, the storage electrode line 131 as the other terminals, and portions of the gate insulating layer 140 and the passivation layer 180 disposed between the two terminals as a dielectric.

The up-down capacitor CU is formed by the projection 195 of the second subpixel electrode 191b, the drain electrode 175c of the third TFT Q3, and a portion of the passivation layer 180 disposed therebetween.

The third storage capacitor Cstc includes two components, one being formed by the drain electrode 175c of the third TFT Q3, the common electrode 270, and the liquid crystal layer 3 disposed therebetween, and the other being formed by the drain electrode 175c of the third TFT Q3, the storage electrode line 131, and the gate insulating layer 140 disposed therebetween.

The first to third storage capacitors Csta, Cstb and Cstc compensate for the capacitances of the first liquid crystal capacitor Clca, the second liquid crystal capacitor Clcb, and the up-down capacitor CU, respectively.

It is noted that the first and second TFTs Q1 and Q2 are connected to the same gate line 121n while the third TFT Q3 is connected to another gate line 121p, i.e., the post gate line 121p.

Now, the operation of the LCD will be described in detail.

When a gate-on voltage is applied to the gate line 121n, the first and second TFTs Q1 and Q2 turn on and thus a data voltage in the data line 171 is applied to both the first subpixel electrode 191a and the second subpixel electrode 191b, simultaneously. Therefore, the first liquid crystal capacitor Clca and the second liquid crystal capacitor Clcb are charged with the same voltage.

When the next gate line 121p is supplied with the gate-on voltage after the first and second TFTs Q1 and Q2 turn off, the third TFT Q3 turns on. Then, the first subpixel electrode 191a and the drain electrode 175c of the third TFT Q3 are electrically connected to each other, and the electric charges stored in the first subpixel electrode 191a and in the drain electrode 175c of the third TFT Q3 are redistributed to vary the voltages of the first subpixel electrode 191a and the third drain electrode 175c. At this time, the voltages of the first subpixel electrode 191a and the third drain electrode 175c vary in opposite directions. That is, if the voltage of the first subpixel electrode 191a decreases, the voltage of the third drain electrode 175c increases. On the contrary, the voltage of the first subpixel electrode 191a rises while the voltage of the third drain electrode 175c falls down.

During the variation of the third drain electrode 175c, the second subpixel electrode 191b, forming two terminals of the up-down capacitor CU along with the third drain electrode 175c, is floating, and thus the voltage of the second subpixel electrode 191b varies in the same direction as that of the third drain electrode 175c according to the variation of the third drain electrode 175c. Therefore, the shift direction of the second subpixel electrode 191b is opposite that of the first subpixel electrode 191a, thereby the voltages of the first liquid crystal capacitor Clca and the second liquid crystal capacitor Clcb are differentiated.

The amount of the voltage variation of the first and second subpixel electrodes 191a and 191b depends on the capacitance of the up-down capacitor CU. When the capacitance of the up-down capacitor CU is different pixel by pixel, the voltage of the first subpixel electrode 191a and the third drain electrode 175c is different pixel by pixel after the first subpixel electrode 191a and the third drain electrode 175c are connected to each other under the application of the same data voltage. Hence, the capacitances of the up-down capacitors CU are uniform all over the pixels in order to obtain the same voltage when the same data voltage is applied to the pixels. In other words, the overlapping areas CA1 and CA2 of the projection 195 and the third drain electrode 175c forming the up-down capacitor CU are uniform regardless of the misalignment as described above with reference to FIGS. 3 and 4.

When the potential difference is generated across the first LC capacitor Clca or the second IC capacitor Clcb, an electric field substantially perpendicular to the surfaces of the panels 100 and 200 is generated in the LC layer 3 and both the pixel electrode 190 and the common electrode 270 are commonly referred to as field generating electrodes hereinafter. Then, the LC molecules in the LC layer 3 tilt in response to the electric field such that their long axes are perpendicular to the field direction. The degree of the tilt of the LC molecules determines the variation of the polarization of light incident on the LC layer 3 and the variation of the light polarization is transformed into the variation of the light transmittance by the polarizers 12 and 22. In this way, the LCD displays images.

The tilt angle of the LC molecules depends on the strength of the electric field. Since the voltage of the first LC capacitor Clca and the voltage of the second LC capacitor Clcb are different from each other, the tilt direction of the LC molecules in the first subpixel PX1 is different from that in the second subpixel PX2 and thus the luminance of the two subpixels is different. Accordingly, with maintaining the average luminance of the two subpixels PX1 and PX2 in a target luminance, the voltages of the first and second subpixels PX1 and PX2 call be adjusted so that an image viewed from a lateral side is the closest to all image viewed from the front, thereby improving the lateral visibility.

Since the voltages of the first and second liquid crystal capacitors Clca and Clcb determine the luminance of the pixel, the luminance of the two subpixels PX1 and PX2 is different between pixels and furthermore, the average luminance of the two subpixels PX1 and PX2 may be different between pixels so that the uniformity of the image display is degraded if the voltages of the first and second subpixel electrodes 191a and 191b are different between pixels when applying the same data voltage. In this reason, it is significant that the capacitance of the up-down capacitor CU is uniform.

Next, LCDs according to other embodiments of the present invention will be described in detail with reference to FIG. 9 to FIG. 12.

Figure 9:
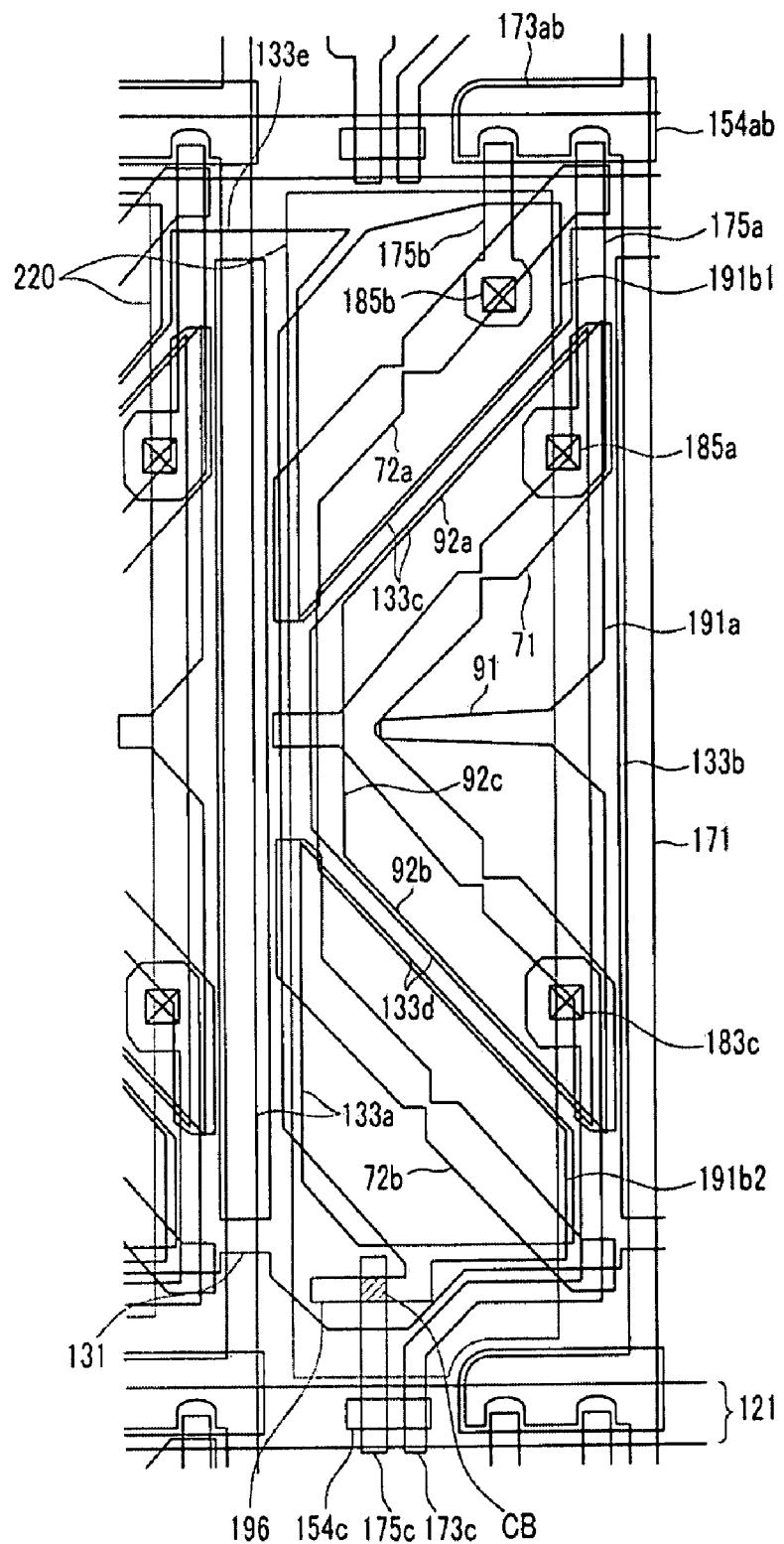
FIGS. 9 and 10 are layout views of LCDs according to another embodiment of the present invention.
Figure 10:
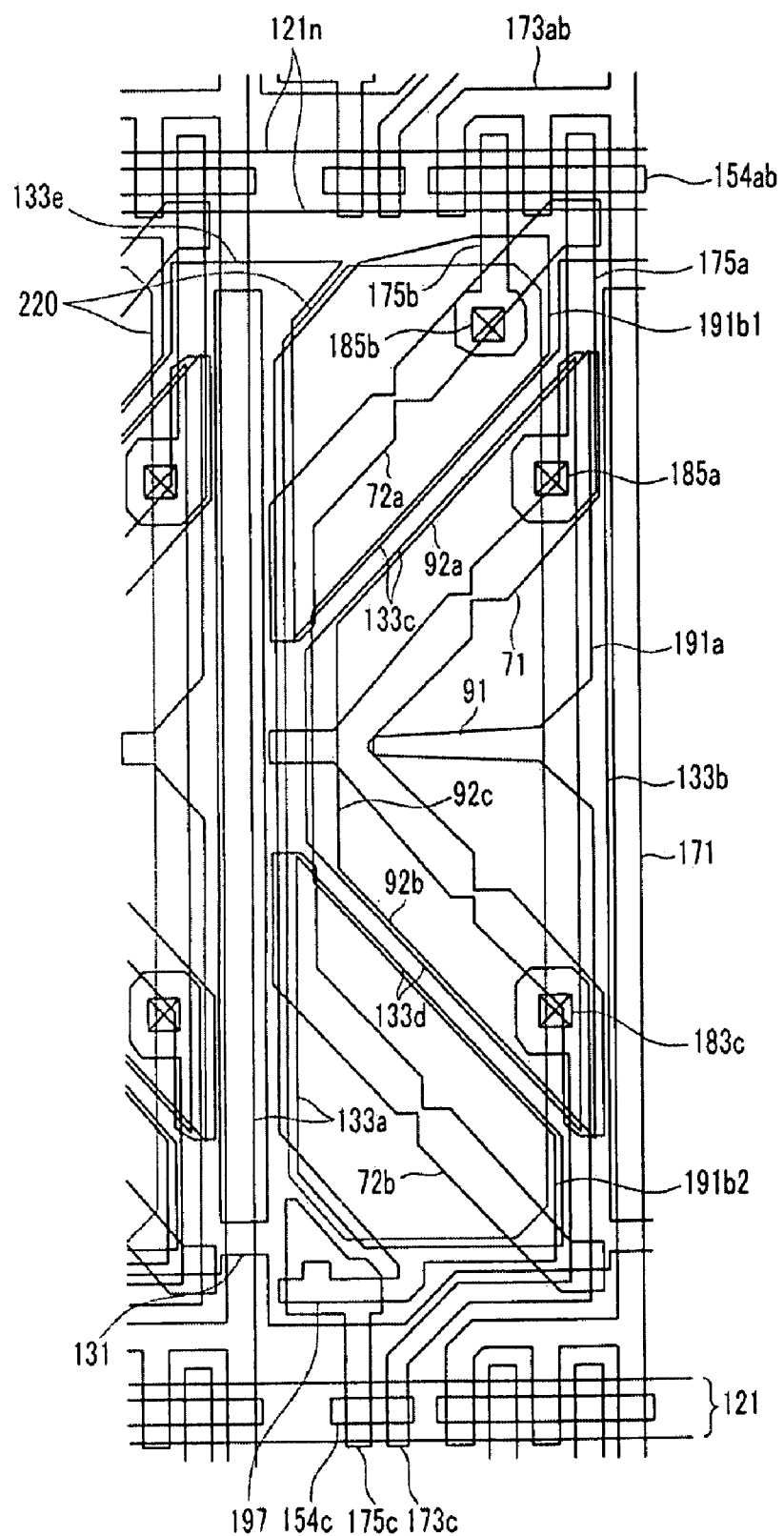
Figure 11:
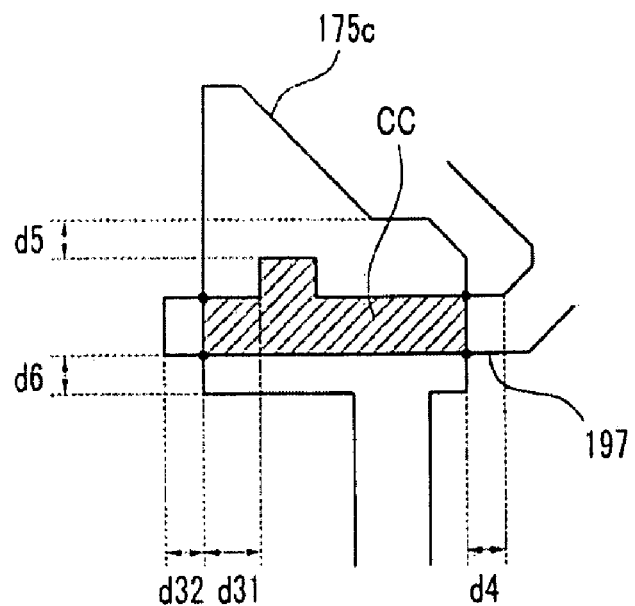
FIG. 11 is an expanded view of an up-down capacitor shown in FIG. 10.
Figure 12:
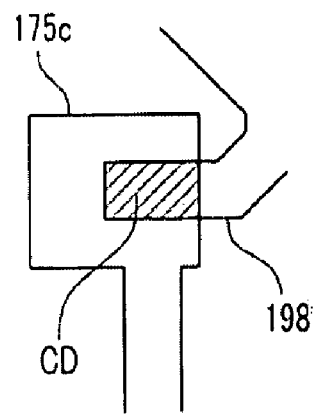
FIG. 12 is a layout view of an up-down capacitor according to another embodiment of the present invention.

FIGS. 9 and 10 are layout views of LCDs according to other embodiments of the present invention, FIG. 11 is an expanded view of a up-down capacitor shown in FIG. 10 and FIG. 12 is a layout view of an up-down capacitor according to another embodiment of the present invention.

The LCDs according to these embodiments have structures similar to that shown in FIGS. 1-7, except for the shapes of projections 196, 197 and 198 and third drain electrodes 175c.

Each of the projections 196, 197 and 198 shown in FIGS. 9-12 extends downward from the meeting point of the lower left oblique edge and the lower edge of the lower electrode portion 191b2, turns left, and overlaps the third drain electrode 175c.

Referring to FIG. 9, the projection 196 and the third drain electrode 175c have shapes of bar near an overlapping area CB like those shown in FIGS. 1-7.

Referring to FIGS. 10 and 11, a portion of the third drain electrode 175c disposed near an overlapping area CC is nearly a combination of a rectangle and a triangle attached to the upper edge of the rectangle. The projection 197 has a bar shape near the overlapping area CC and passes through the third drain electrode 175c.

The projection 197 includes a rectangular branch disposed near the left edge of the third drain electrode 175c and extending upward. The rectangular branch is disposed within the overlapping area CC. Considering the misalignment margin, the distance d31 from the left edge of the third drain electrode 175c to the left edge of the rectangular branch and the distance d32 from the left edge of the third drain electrode 175c to the left end of the projection 197 are designed to be larger than the allowable transverse alignment error range. In addition, it is designed such that the upper edge of the rectangular branch does not meet the upper edge of the third drain electrode 175c under the consideration of the misalignment. For example, it is designed so that the distance d5 between the upper edge of the rectangular portion of the third drain electrode 175c and the upper edge of the rectangular branch is greater than the allowable misalignment margin as shown in FIG. 11.

The projection 197 is curved at the right side of the overlapping area CC toward the lower electrode portion 191b2, and thus it is designed such that the distance d4 between the curve position and the third drain electrode 175c is larger than the allowable misalignment margins. Furthermore, the distance d6 between the lower edge of the projection 197 and the lower edge of the rectangular portion of the third drain electrode 175c is designed to be greater than the allowable misalignment margin.

The third drain electrode 175c shown in FIG. 12 becomes is nearly a rectangle near the overlapping area CC, and the projection 198 is a bar shape near the overlapping area CC. However, the projection 198 does not pass through the third drain electrode 175c unlike previous embodiments. In this case, the overlapping area CD varies upon the transverse misalignment while the longitudinal misalignment does not change the overlapping area CD.

The condition for obtaining uniform overlapping area regardless of the misalignment is further generalized, which is described with reference to FIG. 13.

Figure 13:
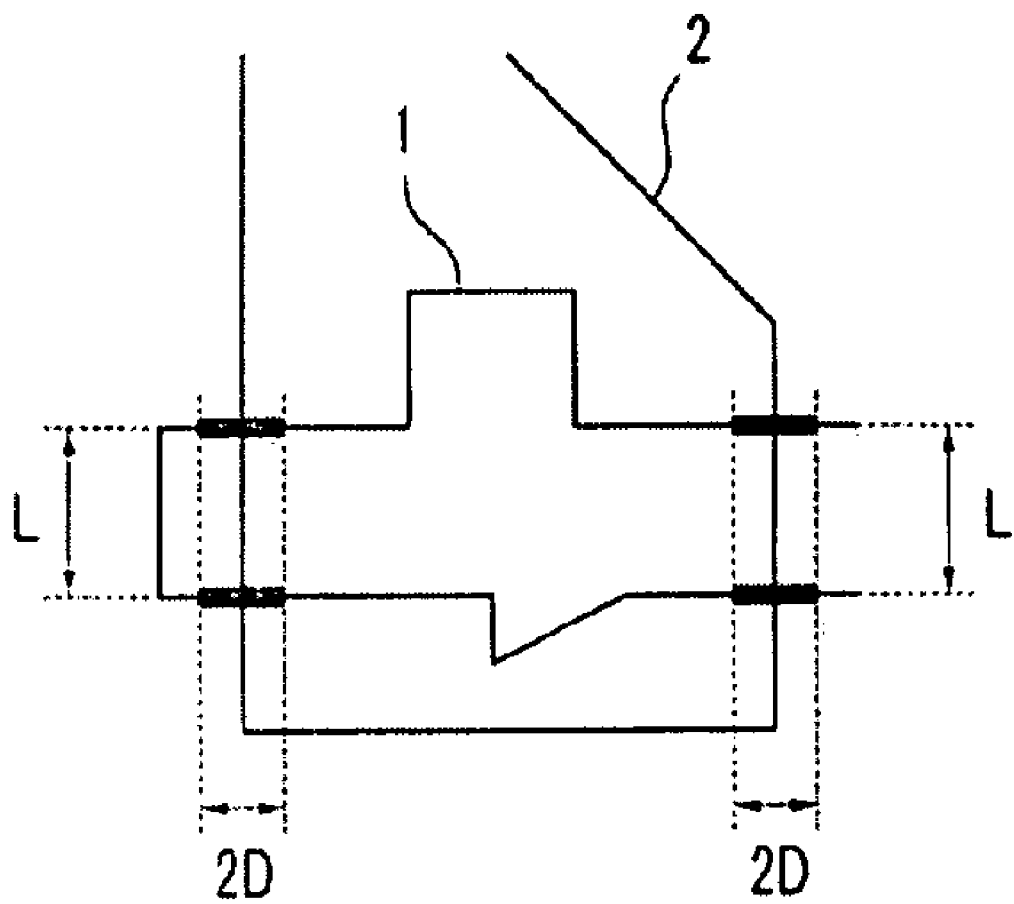
FIG. 13 is a schematic layout view of an up-down capacitor according to another embodiment of the present invention.

FIG. 13 schematically shows overlapping of two members.

Referring to FIG. 13, the first member 1 passes through the second member 2 and the number of intersections of the edges of the first member 1 and the second member 2 is four. The left edge of the second member 2 meets edges of the first member 1 twice, and the right edge of the second member 2 also meets the edges of the first member 1 twice.

The first member 1 has four edge portions near the intersections, and each of the four edge portions having a length substantially equal to or greater than twice the allowable alignment error margin D. A pair of edge portions that meet the left edge of the second member 2 are substantially parallel to each other, and another pair of edge portions that meet the right edge of the second member 2 are substantially parallel to each other and may not be parallel to the former pair of edge portions. The longitudinal distance L between the two edge portions in one pair is substantially the same as the longitudinal distance L between the two edge portions in the other pair.

Furthermore, although remaining edge portions disposed between the parallel edge portions can have any shape, they are disposed within the second member 2 and thus they are designed to be spaced apart from the edges of the second member 2 by a distance greater than the allowable alignment error range D.

This configuration gives uniform overlapping area regardless of transverse misalignment that lies within the allowable alignment error range D.

Similarly, when the edges of the second member 2 meet the above-described condition, the overlapping area maintains uniform regardless of longitudinal misalignment.

It is noted that the projection 198 shown in FIG. 12 has only one pair of parallel edges portions.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A thin film transistor array panel comprising:

a substrate;

a first gate line disposed on the substrate;

a second gate line disposed on the substrate and separated from the first gate line;

a data line intersecting the first and second gate lines;

a first thin film transistor connected to the first gate line and the data line;

a second thin film transistor connected to the first gate line and the data line;

a third thin film transistor connected to the second gate line and having a drain electrode; and a pixel electrode including a first subpixel electrode and a second subpixel electrode, wherein the first subpixel electrode is connected to the first and third thin film transistor, the second subpixel electrode is connected to the second thin film transistor and includes a projection overlapping the drain electrode, and the projection has a first pair of edge portions that meet a first edge of the drain electrode and are substantially parallel to each other.

2. The thin film transistor array panel of claim 1, wherein edges of the projection and edges of the drain electrode form two intersections.

3. The thin film transistor array panel of claim 1, wherein edges of the projection and edges of the drain electrode form four intersections.

4. The thin film transistor array panel of claim 3, wherein the projection further comprises a second pair of edge portions that meet a second edge of the drain electrode and are substantially parallel to each other, and a distance between the edge portions in the first pair along a first direction is substantially the same as a distance between the edge portions in the second pair along the first direction.

5. The thin film transistor array panel of claim 4, wherein the first edge and the second edge of the drain electrode comprises a first pair of drain edge portions substantially parallel to each other and a second pair of drain edge portions substantially parallel to each other.

6. The thin film transistor array panel of claim 5, wherein a distance between the edge portions in the first pair of drain edge portions along a second direction substantially perpendicular to the first direction is substantially the same as a distance between the edge portions in the second pair of drain edge portions along the second direction.

7. The thin film transistor array panel of claim 6, wherein the edge portions and the drain edge portions are equal to or longer than twice an alignment error range.

8. The thin film transistor array panel of claim 6, wherein the projection has a shape of a bar and passes through the drain electrode.

9. The thin film transistor array panel of claim 8, wherein the projection has a uniform width.

10. The thin film transistor array panel of claim 9, wherein the drain electrode has a uniform width.

11. The thin film transistor array panel of claim 6, wherein the projection has a branch fully overlapping the drain electrode.

12. The thin film transistor array panel of claim 1, further comprising a storage electrode overlapping the drain electrode.

* * * * *